(12) United States Patent
Yang et al.

(10) Patent No.: US 8,926,098 B2
(45) Date of Patent: Jan. 6, 2015

(54) ILLUMINATION SYSTEM AND PROJECTION APPARATUS

(75) Inventors: Tzu-Yi Yang, Hsin-Chu (TW);
Chi-Hsun Wang, Hsin-Chu (TW);
Ko-Shun Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 423 days.

(21) Appl. No.: 13/549,534

(22) Filed: Jul. 16, 2012

(65) Prior Publication Data

US 2013/0100417 A1   Apr. 25, 2013

(30) Foreign Application Priority Data

Oct. 21, 2011   (CN) .......................... 2011 1 0329954

(51) Int. Cl.
*G03B 21/00*   (2006.01)
*H04N 9/31*    (2006.01)
*G03B 21/20*   (2006.01)
*G03B 33/08*   (2006.01)
*G02B 27/48*   (2006.01)

(52) U.S. Cl.
CPC ............ *H04N 9/3114* (2013.01); *G03B 21/204* (2013.01); *G03B 21/208* (2013.01); *G03B 33/08* (2013.01); *H04N 9/3161* (2013.01); *G02B 27/48* (2013.01)
USPC .......................................................... 353/31

(58) Field of Classification Search
CPC .... G03B 21/204; G03B 21/28; H04N 9/3161; F21S 10/007
USPC ............................................. 353/31; 362/84
See application file for complete search history.

(56) References Cited

U.S. PATENT DOCUMENTS

| | | | |
|---|---|---|---|
| 7,461,950 B2 | 12/2008 | Yamanaka | |
| 2010/0328632 A1* | 12/2010 | Kurosaki et al. | ................ 353/98 |
| 2011/0205502 A1 | 8/2011 | Kato et al. | |
| 2014/0125956 A1* | 5/2014 | Chifu et al. | ..................... 353/31 |

FOREIGN PATENT DOCUMENTS

| | | |
|---|---|---|
| CN | 101008710 | 8/2007 |
| CN | 102213384 | 10/2011 |
| JP | 2004341105 | 12/2004 |

OTHER PUBLICATIONS

"Office Action of Chinese Counterpart Application", issued on Aug. 18, 2014, p. 1-p. 5.

* cited by examiner

*Primary Examiner* — Sultan Chowdhury
*Assistant Examiner* — Danell L Owens
(74) *Attorney, Agent, or Firm* — Jianq Chyun IP Office (57) ABSTRACT

An illumination system includes a coherent light source, a phosphor switching module, a beam combining unit and a diffusion switching module. The coherent light source emits a coherent light beam. The phosphor switching module includes a light passing section and a first phosphor reflecting section. The light passing section and first phosphor reflecting section are switched into a transmission path of the coherent light beam by turns. The first phosphor reflecting section converts and reflects the coherent light beam into a first color beam. The beam combining unit combines the coherent light beam passing through the light passing section and the first color light beam. The diffusion switching module includes a light diffusion section and a first light permeable section to be switched into the transmission paths of the coherent light beam and the first color light beam by turns. A projection apparatus is also disclosed.

26 Claims, 8 Drawing Sheets

ILLUMINATION SYSTEM AND PROJECTION APPARATUS

CROSS-REFERENCE TO RELATED APPLICATION

This application claims the priority benefit of China application serial no. 201110329954.3, filed on Oct. 21, 2011. The entirety of the above-mentioned patent application is hereby incorporated by reference herein and made a part of this specification.

BACKGROUND OF THE INVENTION

1. Field of the Invention

The invention relates to a display apparatus and an optical system, and more particularly, to a projection apparatus and an illumination system.

2. Description of Related Art

Recently, projection apparatuses using solid state light sources such as, light emitting diodes (LEDs) and laser diodes, have gradually held considerable market share. The luminescence efficiency of the LEDs is about 5% to 8%, and the LEDs have different luminescence spectrums available for selection, including red, green and blue spectrums. The LEDs have excellent luminescence spectrums, i.e. having a high spectrum peak value and a narrow spectrum width, and, therefore, can be used as pure color light sources for projectors.

On the other hand, the laser diodes have luminescence efficiency greater than 20%. In order to break through the limit of the LEDs as light sources, using a laser source to excite a phosphor powder to produce the pure color light source for projectors has been gradually developed. The two types of light sources are the main stream of the solid state light sources for current projectors.

In order to achieve a sufficient output luminance, a laser projection apparatus can use an array of multiple laser diodes, and laser beams emitted by the laser diodes are focused onto the phosphor layer to produce a fluorescence having a sufficient intensity. The array of laser diodes can produce a rather high light output power to excite the phosphor and the number of the light sources can be flexibly adjusted to achieve different levels of luminance for projectors. Therefore, projection apparatus using this type of light sources have huge potential to replace the projection apparatus using the conventional ultra high pressure lamp (UHP lamp) as a light source and become the main stream of next generation projection apparatus.

US Patent Publication No. 20100328632 disclosed a light source device including a light source, a dichroic mirror, three reflecting mirrors, a color wheel, and a light integration rod. US Patent Publication No. 20110205502 disclosed a projection apparatus including a blue light source, a red light source, a light volume controller, an integrator, a color wheel, a dichroic mirror, reflecting mirrors, a light valve, a light sensor, a light volume regulator and a projection lens. U.S. Pat. No. 7,461,950 disclosed a light source device including a light source, a light converting section, a color wheel, a UV-IR cutting filter, a light-polarization converting element, an integrator, an illumination optical system, a light modulating device, and a projection apparatus. The color wheel is operable synchronously with the light converting section to generate a light having sufficient brightness and purified color.

SUMMARY OF THE INVENTION

Accordingly, the invention is directed to an illumination system having a prolonged lifespan.

The invention is also directed to a projection apparatus having a prolonged lifespan.

Other advantages of the invention can be further comprehended from the technical features disclosed in the invention.

One embodiment of the invention provides an illumination system including a coherent light source, a phosphor switching module, a beam combining unit, and a diffusion switching module. The coherent light source is capable of emitting a coherent light beam. The phosphor switching module is disposed on a transmission path of the coherent light beam. The phosphor switching module includes a light passing section and a first phosphor reflecting section. The light passing section and the first phosphor reflecting section are capable of being switched into the transmission path of the coherent light beam by turns. The first phosphor reflecting section is capable of converting and reflecting the coherent light beam into a first color light beam. The beam combining unit is capable of combining the coherent light beam passing through the light passing section and the first color light beam converted and reflected by the first phosphor reflecting section. The diffusion switching module is disposed on transmission paths of the coherent light beam and the first color light beam from the beam combining unit to process the coherent light beam and the first color light beam into an illumination light beam. The diffusion switching module includes a light diffusion section and a first light permeable section. When the light passing section of the phosphor switching module is switched onto the transmission path of the coherent light beam, the light diffusion section of the diffusion switching module is switched onto the transmission path of the coherent light beam from the beam combining unit. When the first phosphor reflecting section of the phosphor switching module is switched onto the transmission path of the coherent light beam, the first light permeable section of the diffusion switching module is switched onto the transmission path of the first color light beam from the beam combining unit.

The phosphor switching module further includes a second phosphor reflecting section. The light passing section, first phosphor reflecting section and second phosphor reflecting section capable of being switched onto the transmission path of the coherent light beam by turns. The second phosphor reflecting section is capable of converting and reflecting the coherent light beam into a second color light beam, and the beam combining unit is capable of combining the coherent light beam passing through the light passing section, the first color light beam converted and reflected by the first phosphor section, and the second color light beam converted and reflected by the second phosphor section. The first light permeable section of the diffusion switching module is a light filtering section, and the diffusion switching module further comprises a second light permeable section. When the second phosphor reflecting section of the phosphor switching module is switched onto the transmission path of the coherent light beam, the second light permeable section of the diffusion switching module is switched onto the transmission path of the second color light beam from the beam combining unit.

The coherent light beam is a blue light beam, the first phosphor reflecting section is an orange-red phosphor reflecting section, the first color light beam is an orange-red light beam, the second phosphor reflecting section is a phosphor reflecting section for converting to a green light beam, the second color light beam is a green light beam, the first light filtering section is a red filtering section, and the second light permeable section is a transparent section.

The first phosphor reflecting section of the phosphor switching module is a yellow phosphor reflecting section, the first light permeable section of the diffusion switching module comprises a red sub-filtering section and a green sub-filtering section, and the red sub-filtering section and the green sub-filtering section are switched into the transmission path of the first color light beam from the beam combining unit by turns when the first phosphor reflecting section is switched into the transmission of coherent light beam. The first light permeable section of the diffusion switching module further comprises a sub-transparent section. When the first phosphor reflecting section of the phosphor switching module is switched into the transmission path of the coherent light beam, the red sub-filtering section, the green sub-filtering section and the sub-transparent section are switched into the transmission path of the first color light beam from the beam combining unit.

The phosphor switching module further comprises a second phosphor reflecting section. The light passing section, the first phosphor reflecting section and the second phosphor reflecting section are capable of being switched into the transmission path of the coherent light beam by turns, the second phosphor reflecting section is capable of converting and reflecting the coherent light beam into a second color light beam, the beam combining unit is capable of combining the coherent light beam passing through the light passing section, the first color light beam converted and reflected by the first phosphor reflecting section, and the second color light beam converted and reflected by the second phosphor reflecting section. The first light permeable section of the diffusion switching module is located at the transmission path of the first color light beam from the beam combining unit when the first phosphor reflecting section and second phosphor reflecting section of the phosphor switching module are switched into the transmission path of the coherent light beam by turns, and the first light permeable section is a transparent section.

One embodiment of the invention provides an illumination system further comprising a light uniforming element disposed on the transmission path of the illumination light beam from the diffusion switching module. The beam combining unit is a dichroic mirror, the dichroic mirror is capable of allowing one of the coherent light beam and the first color light beam to pass through, and capable of reflecting the other of the coherent light beam and the first color light beam. The beam combining unit is disposed on the transmission path of the coherent light beam and between the coherent light source and the phosphor switching module, and the illumination system further comprises a plurality of reflecting mirrors disposed on the transmission path of the coherent light beam from the light passing section of the phosphor switching module to sequentially reflect the coherent light beam back to the beam combining unit. The phosphor switching module and the diffusion switching module are each a rotary wheel for rotation. The light passing section of the phosphor switching module is a transparent section or an opening without material disposed thereat.

Another embodiment of the invention provides a projection apparatus including the above illumination system, a light valve and a projection apparatus. The light valve is disposed on the transmission path of the illumination light beam from the diffusion switching module to convert the illumination light beam into an image light beam. The projection lens is disposed on a transmission path of the image light beam.

Embodiments of the invention may have at least one of the following advantages. In the projection apparatus and illumination system of embodiments, the light diffusion section is disposed in the diffusion switching module that is disposed on a downstream light path of the phosphor switching module. Therefore, the coherent light beam can excite the first phosphor reflecting section of the phosphor switching module without damaging the light diffusion section. Therefore, the lifespan of the light diffusion section can be prolonged, thus prolonging the lifespan of the projection apparatus and illumination system.

The light diffusion section is disposed in the diffusion switching module that is disposed on the downstream light path of the phosphor switching module, such that the Etendue of light can be small. As a result, small sized optical elements can be used, which can reduce the overall size of the optical system.

The phosphor switching module can replace the red phosphor with the orange-red phosphor, which can increase the conversion efficiency of the phosphor to improve the color performance.

Other objectives, features and advantages of the invention will be further understood from the further technological features disclosed by the embodiments of the invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
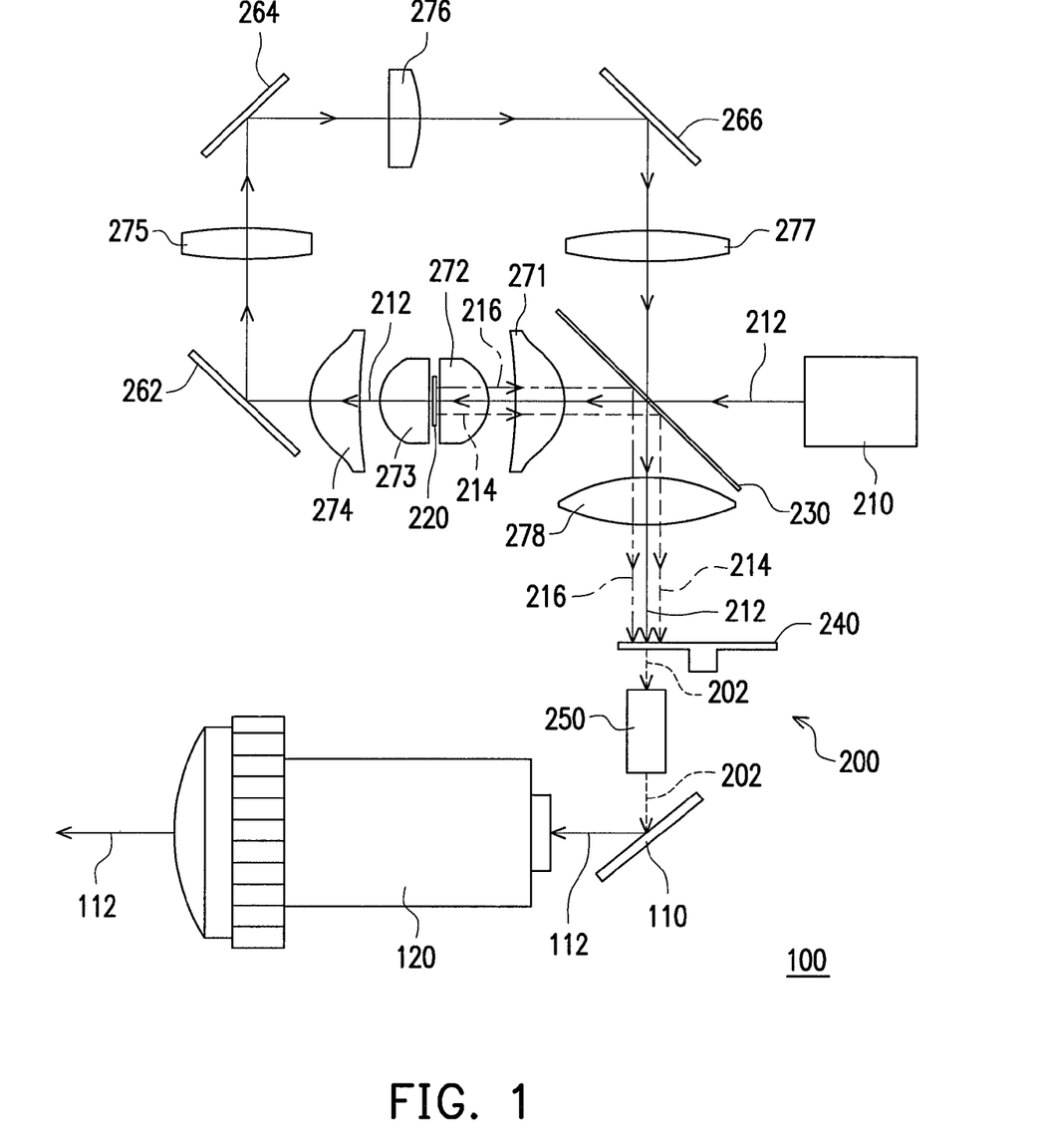
FIG. 1 illustrates a projection apparatus according to one embodiment of the invention.
Figure 2:
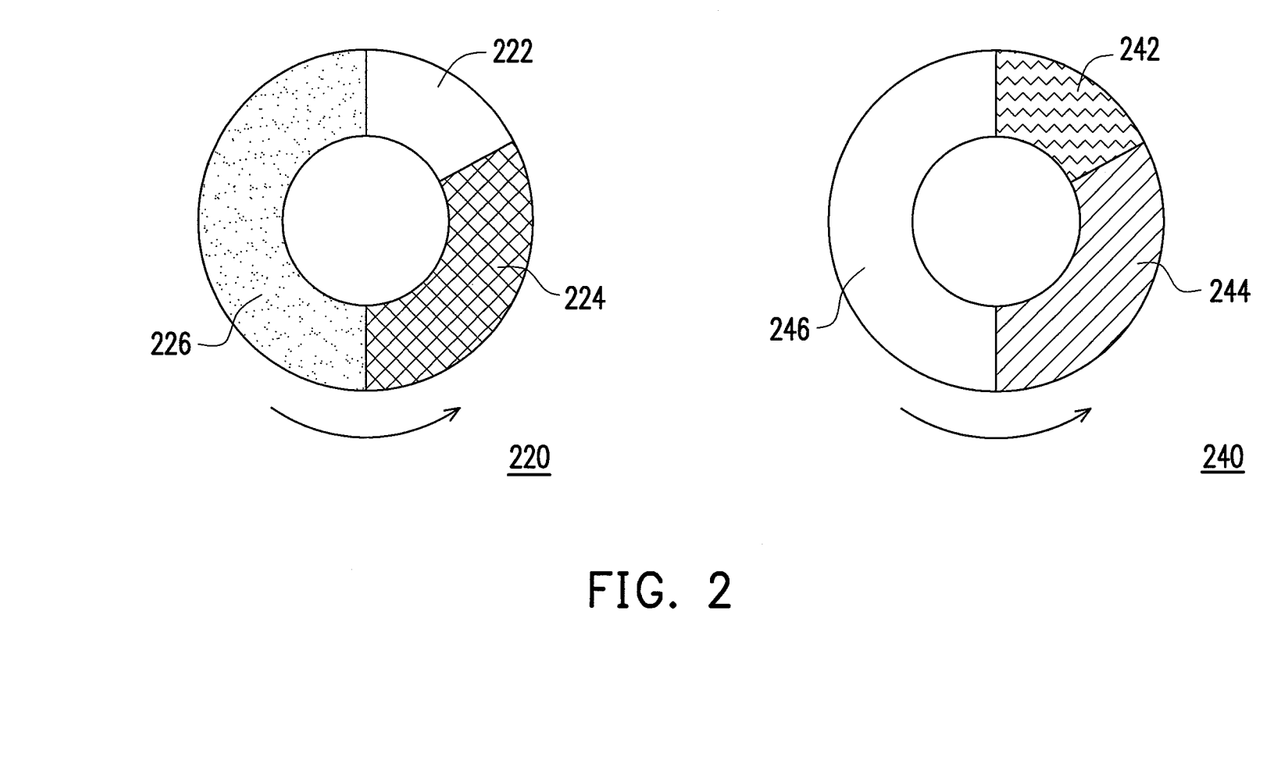
FIG. 2 is a front view of a phosphor switching module and a diffusion switching module of FIG. 1.

FIG. 1 illustrates a projection apparatus according to one embodiment of the invention, and FIG. 2 is a front view of a phosphor switching module and a diffusion switching module of FIG. 1. Referring to FIG. 1 and FIG. 2, the projection apparatus 100 in the embodiment includes an illumination system 200, a light valve 110 and a projection lens 120. The illumination system 200 includes a coherent light source 210, a phosphor switching module 220, a beam combining unit 230, and a diffusion switching module 240. The coherent light source 210 is capable of emitting a coherent light beam 212. In the embodiment, the coherent light source 210 is, for example, a laser diode, a light emitting diode or any other suitable light generator, and the coherent light beam 212 may be a laser beam. Besides, in the embodiment, the coherent light beam 212 is, for example, a blue light beam.

The phosphor switching module 220 is disposed on a transmission path of the coherent light beam 212. As shown in FIG. 2, the phosphor switching module 220 includes a light passing section 222 and a first phosphor reflecting section 224. The light passing section 222 and the first phosphor reflecting section 224 are capable of being switched into the transmission path of the coherent light beam 212 by turns. In addition, the first phosphor reflecting section 224 is capable of converting and reflecting the coherent light beam 212 into a first color light beam 214. In the embodiment, the light passing section 222 is a transparent section. However, in another embodiment, the light passing section 222 may be an opening having no material disposed thereat. When the light passing section 222 is switched into the transmission path of the coherent light beam 212, the coherent light beam 212 from the coherent light source 210 passes through the light passing section 222. In addition, the first phosphor reflecting section 224 is formed, for example, by a reflecting substrate and a phosphor layer coated on the reflecting substrate. The reflecting substrate may be a metal substrate, or a glass substrate with a reflective film, such that, when the first phosphor reflecting section 224 is switched into the transmission path of the coherent light beam 212, the coherent light beam 212 excites the phosphor layer of the first phosphor reflecting section 224 to generate the first color light beam 214, and the reflecting substrate of the first phosphor reflecting section 224 uses for reflecting the first color light beam 214. In the embodiment, the first phosphor reflecting section 224 is, for example, an orange-red phosphor reflecting section, i.e. the phosphor layer of the first phosphor reflecting section 224 is an orange-red phosphor layer, and the first color light beam 214 is an orange-red light beam.

In the embodiment, the phosphor switching module 220 further includes a second phosphor reflecting section 226. The light passing section 222, the first phosphor reflecting section 224, and the second phosphor reflecting section 226 are capable of being switched into the transmission path of the coherent light beam 212 by turns. The second phosphor reflecting section 226 is capable of converting the coherent light beam 212 into a second color light beam 216 and reflecting the second color light beam 216. The second phosphor reflecting section 226 is formed, for example, by a reflecting substrate and a phosphor layer coated on the reflecting substrate. In the embodiment, the phosphor layer is, for example, a green phosphor layer, i.e. the second phosphor reflecting section 226 is, for example, a green phosphor reflecting section, and the second color light beam 216 is, for example, a green light beam. Specific explanation, the above-mentioned green phosphor layer is defined that a phosphor layer excited by an excitation light converts into a light with green color. Therefore, yellow phosphor, orange-red phosphor etc., are the same explanation.

In the embodiment, the phosphor switching module 220 is a rotary wheel for rotation, and the light passing section 222, the first phosphor reflecting section 224, and the second phosphor reflecting section 226 are each a fan-shaped section. When the phosphor switch module 220 rotates, the light passing section 222, the first phosphor reflecting section 224 and the second phosphor reflecting section 226 are switched into the transmission path of the coherent light beam 212 by turns.

The beam combining unit 230 is capable of combining the coherent light beam 212 passing through the light passing section 222 and the first color light beam 214 converted and reflected by the first phosphor reflecting section 224. In the embodiment, the beam combining unit 230 is capable of combining the coherent light beam 212 passing through the light passing section 222, the first color light beam 214 converted and reflected by the first phosphor reflecting section 224, and the second color light beam 216 converted and reflected by the second phosphor reflecting section 226. The diffusion switching module 240 is disposed on the transmission paths of the coherent light beam 212 and the first color light beam 214 from the beam combining unit 230 to process the coherent light beam 212 and the first color light beam 214 into an illumination light beam 202. In the embodiment, the diffusion switching module 240 processes the coherent light beam 212, the first color light beam 214 and the second color light beam 216 into the illumination light beam 202.

In the embodiment, the beam combining unit 230 is a dichroic mirror capable of allowing one of the coherent light beam 212 and the first color light beam 214 to pass through and capable of reflecting the other of the coherent light beam 212 and the first color light beam 214. In the embodiment, the beam combining unit 230 is capable of allowing the coherent light beam 212 to pass through and capable of reflecting the first color light beam 214 and the second color light beam 216. In the embodiment, the beam combining unit 230 is disposed on the transmission path of the coherent light beam 212 and between the coherent light source 210 and the phosphor switch module 220. Specifically, the beam combining unit 230 allows the coherent light beam 212 from the coherent light source 210 to pass through and to travel to the phosphor switching module 220, and the beam combining unit 230 reflects the first color light beam 214 and the second color light beam 216 converted and reflected by the phosphor switching module 220 to the diffusion switching module 240.

In the embodiment, the illumination system 200 further includes a plurality of reflecting minors (e.g. reflecting mirrors 262, 264 and 266) disposed on the transmission path of the coherent light beam 212 passing through the light passing section 222 of the phosphor switching module 220 to sequentially reflect the coherent light beam 212 back to the beam combining unit 230. Specifically, when the light passing section 222 of the phosphor switching module 220 is switched into the transmission path of the coherent light beam 212, the coherent light beam 212 from the coherent light source 210 and the beam combining unit 230 passes through the light passing section 222 and then the coherent light beam 212 is transmitted to the reflecting minor 262. The reflecting mirror 262 then reflects the coherent light beam 212 to the reflecting minor 264; the reflecting minor 264 then reflects the coherent light beam 212 to the reflecting minor 266; finally, the reflecting minor 266 reflects the coherent light beam 212 to the beam combining unit 230, and the coherent light beam 212 is then transmitted through the beam combining unit 230 to the diffusion switching module 240.

In another embodiment, however, the beam combining unit 230 may reflect the coherent light beam 212 from the coherent light source 210 to the phosphor switching module 220. In this case, the positions of the coherent light source 210 and the diffusion switch module 240 may be interchanged. When the coherent light beam 212 passes through the light passing section 222, it is sequentially reflected by the reflecting minors 262, 264 and 266 back to the beam combining unit 230, and the beam combining unit 230 then reflects the coherent light beam 212 to the diffusion switching module 240. In addition, the first color light beam 214 and the second color light beam 216 sequentially converted and reflected by the phosphor switching module 220 are transmitted through the beam combining unit 230 to the diffusion switching module 240.

Referring to FIG. 2, the diffusion switching module 240 includes a light diffusion section 242 and a light permeable section 244. In the embodiment, the light diffusion section 242 is, for example, a light diffusion sheet which has surface diffusion structures or contains scattering particles or scattering materials in an interior thereof. In addition, in the embodiment, the first light permeable section 244 is a light filtering section such as a red filtering section. When the light passing section 222 of the phosphor switching module 220 is switched into the transmission path of the coherent light beam 212, the light diffusion section 242 of the diffusion switching module 240 is switched into the transmission path of the coherent light beam 212 from the beam combining unit 230. At this time, the coherent light beam 212 passes through the light passing section 222 and is reflected by the reflecting mirrors 262, 264, 266 back to the beam combining unit 230, and is then transmitted to the light diffusion section 242. The light diffusion section 242 can diffuse the coherent light beam 212, thereby reducing speckle of the coherent light beam 212.

When the first phosphor reflecting section 224 of the phosphor switching module 220 is switched into the transmission path of the coherent light beam 212, the first light permeable section 244 of the diffusion switching module 240 is switched into the transmission path of the first color light beam 214 from the beam combining unit 230. At this time, the first phosphor reflecting section 224 converts and reflects the coherent light beam 212 into a first color light beam 214 (i.e. the orange-red light beam in the embodiment), and the beam combining unit 230 then causes the first color light beam 214 to be transmitted to the first light permeable section 244. The first light permeable section 244 then filters the first color light beam 214 (orange-red light beam) to produce a red light beam.

In the embodiment, the diffusion switching module 240 further includes a second light permeable section 246, and the second light permeable section 246 is, for example, a transparent section. When the second phosphor reflecting section 226 of the phosphor switching module 220 is switched into the transmission path of the coherent light beam 212, the second light permeable section 246 of the diffusion switching module 240 is switched into the transmission path of the second color light beam 216 from the beam combining unit 230. At this time, the second phosphor reflecting section 226 converts and reflects the coherent light beam 212 into a second color light beam 216 (i.e. the green light beam in the embodiment), and the beam combining unit 230 then causes the second color light beam 216 to be transmitted to the second light permeable section 246, and the second light permeable section 246 allows the second color light beam 216 to pass through.

In the embodiment, the coherent light beam 212 (the blue light beam in the embodiment) diffused by the light diffusion section 242, the red light beam produced by filtering of the first light permeable section 244, and the second color light beam 216 (the green light beam in the embodiment) transmitted through the second light permeable section 246 are transmitted out of the diffusion switching module 240 by turns to form the illumination light beam 202. In the embodiment, the diffusion switching module 240 is, for example, a rotary wheel for rotation, and the light diffusion section 242, the first light permeable section 244 and the second light permeable section 246 are each a fan-shaped section. When the rotary wheel rotates, the light diffusion section 242, the first light permeable section 244 and the second light permeable section 246 are switched into the path of the light produced by combination of the beam combining unit 230 by turns, i.e. they are switched into the transmission paths of the coherent light beam 212, the first color light beam 214 and the second color light beam 216 at different times, respectively.

The light valve 110 is disposed on the transmission path of the illumination light beam 202 from the diffusion switching module 240 to convert the illumination light beam 202 into an image light beam 112. In the embodiment, the light valve 110 is, for example, a digital micro-mirror device (DMD). In other embodiments, however, the light valve 110 may also be a liquid-crystal-on-silicon panel (LCD panel), a transmissive type LCD panel or any other suitable spatial light modulator. The projection lens 120 is disposed on the transmission path of the illumination light beam 112 to project the illumination light beam 112 onto a screen to produce an image. In the embodiment, the illumination light beam 202 contains the red beam, green beam and blue beam and, therefore, the projection apparatus 100 can project full color images.

In the embodiment, the illumination system 200 further includes a light uniforming element 250 disposed on the transmission path of the illumination light beam 202 from the diffusion switching module 240 and between the diffusion switching module 240 and the light valve 110. In the embodiment, the light uniforming element 250 is, for example, a light integration rod for uniformizing the illumination light beam 202.

In the projection apparatus 100 and the illumination system 200 of the embodiment, the light diffusion section 242 is disposed in the diffusion switching module 240 that is disposed on a downstream light path of the phosphor switching module 220. Therefore, the coherent light beam 212 can excite the first phosphor reflecting section 224 and the second phosphor reflecting section 226 of the phosphor switching module 220 without damaging the light diffusion section 242. Specifically, in the embodiment, a light spot of the coherent light beam 212 on the phosphor switching module 220 is smaller than a light spot of the coherent light beam 212 on the diffusion switching module 240. The reason of such design is that the coherence light beam 212 needs to excite the phosphor layer on the phosphor switching module 220 and, therefore, the light spot needs to be small to concentrate the light energy to excite the phosphor layer to produce more intensive first color light beam 214 and second color light beam 216. However, the light spot on the diffusion switching module 240 can be large because the light spot can be of any size as long as the illumination light beam 202 can enter the light uniforming element 250. Therefore, although the light spot on the phosphor switching module 220 is small, a light passing section 222, instead of a light diffusion section 242, is formed in the phosphor switching module 220, which is unlikely to absorb or does not absorb the energy of the coherent light beam 212 and, as a result, the light passing section 222 is unlikely to be damaged by the coherent light beam 212 when the operation time passes. On the other hand, the light diffusion section 242 is disposed at the position of the relatively large light spot, where the light energy is not so concentrated, i.e. the light intensity on unit area is small. Therefore, the damage to the light diffusion section 242 by the coherent light beam 212 when the operation times passes can be suppressed. As such, the lifespan of the light diffusion section 242 can be prolonged, thereby prolonging the lifespan of the illumination system 200 and the projection apparatus 100.

In general, when a light passes the light diffusion section 242, the Etendue of the light is increased. The diffused light can be collected as much as possible by using a relatively greater number of optical elements or optical elements of a relatively greater size. In the embodiment, the diffusion switching module 240 is disposed adjacent to the light uniforming element 250, i.e. disposed such that, when diffusing the coherent light beam 212, the light diffusion section 242 is adjacent the light uniforming element 250. Therefore, the light uniforming element 250 and the light diffusion section 242 have a small distance therebetween which is advantageous in collecting the light. Thus, the embodiment does not need to utilize a great number of optical elements or optical elements of a great size to collect the coherent light beam 212 diffused by the light diffusion section 242, thus reducing the size of the illumination system 200 and the projection apparatus 100.

In the embodiment, multiple lenses, such as lenses 271 to 278, may be optionally disposed at the light path depending upon actual requirements. In the embodiment, the lenses 271 and 272 are disposed between the beam combining unit 230 and the phosphor switching module 220, the lenses 273 and 274 are disposed between the phosphor switching module 220 and the reflecting mirror 262, the lens 275 is disposed between the reflecting minor 262 and the reflecting minor 264, the lens 276 is disposed between the reflecting mirror 264 and the reflecting mirror 266, the lens 277 is disposed between the reflecting mirror 266 and the beam combining unit 230, and the lens 278 is disposed between the beam combining unit 230 and the diffusion switching module 240. In addition, in the embodiment, a control unit may electrically connect the phosphor switching module 220 and the diffusion switching module 240 to control the phosphor switching module 220 and the diffusion switching module 240 to operate synchronously, for example, to rotate synchronously.

Figure 3:
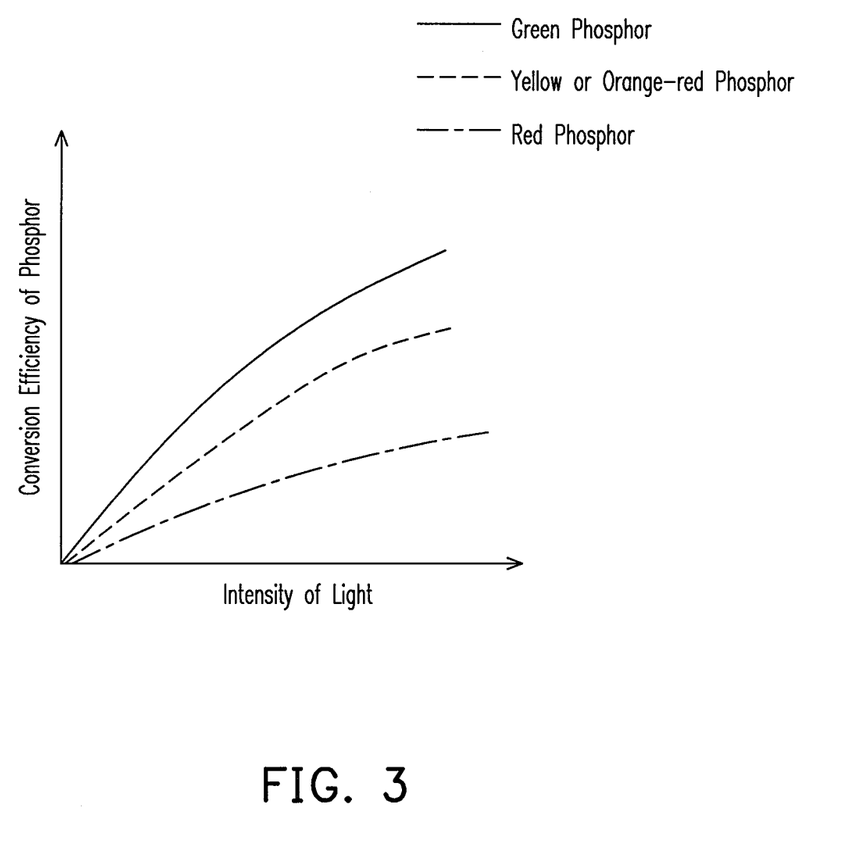
FIG. 3 illustrates a thermal quenching effect of the phosphor.

FIG. 3 is a view illustrating the thermal quenching effect of the phosphor. Referring to FIG. 1 to FIG. 3, in FIG. 3, the vertical axis represents the conversion efficiency of the phosphor converting an incident light into a phosphor light when the phosphor is illuminated by the incident light, and the horizontal axis represents the intensity of the incident light. As can be seen from FIG. 3, the acceleration of the increase in the conversion efficiency of the phosphor is gradually decreased with the increase of the light intensity of the incident light, wherein the acceleration of the increase in the conversion efficiency of the green phosphor is decreased by a small extent, the acceleration of the increase in the conversion efficiency of the yellow or orange-red phosphor is decreased by a larger extent, and the acceleration of the increase in the conversion efficiency of the red phosphor is decreased by the largest extent. In other words, causing the red phosphor to emit an intensive phosphor light is most difficult for the incident light, causing the green phosphor to emit an intensive phosphor light is easiest, and causing the yellow or orange-red phosphor to emit an intensive phosphor light imposes a medium difficulty to the incident light. The conversion efficiency of the orange-red phosphor is higher than that of the red phosphor and, therefore, the embodiment utilizes the first phosphor reflecting section 224 (which has orange-red phosphor) in combination with the first light permeable section 244 (i.e. a red filtering section) to produce an intensive red light. While the first light permeable section 244 filters the light which reduces the light intensity, the intensity of the red light produced in the embodiment is still greater than that of the red light produced directly by the blue coherent light beam exciting the red phosphor. As a result, the optical efficiency of the illumination system 200 can be increased, and the luminance and color performance of the image produced by the projection apparatus 100 can also be improved.

Figure 4:
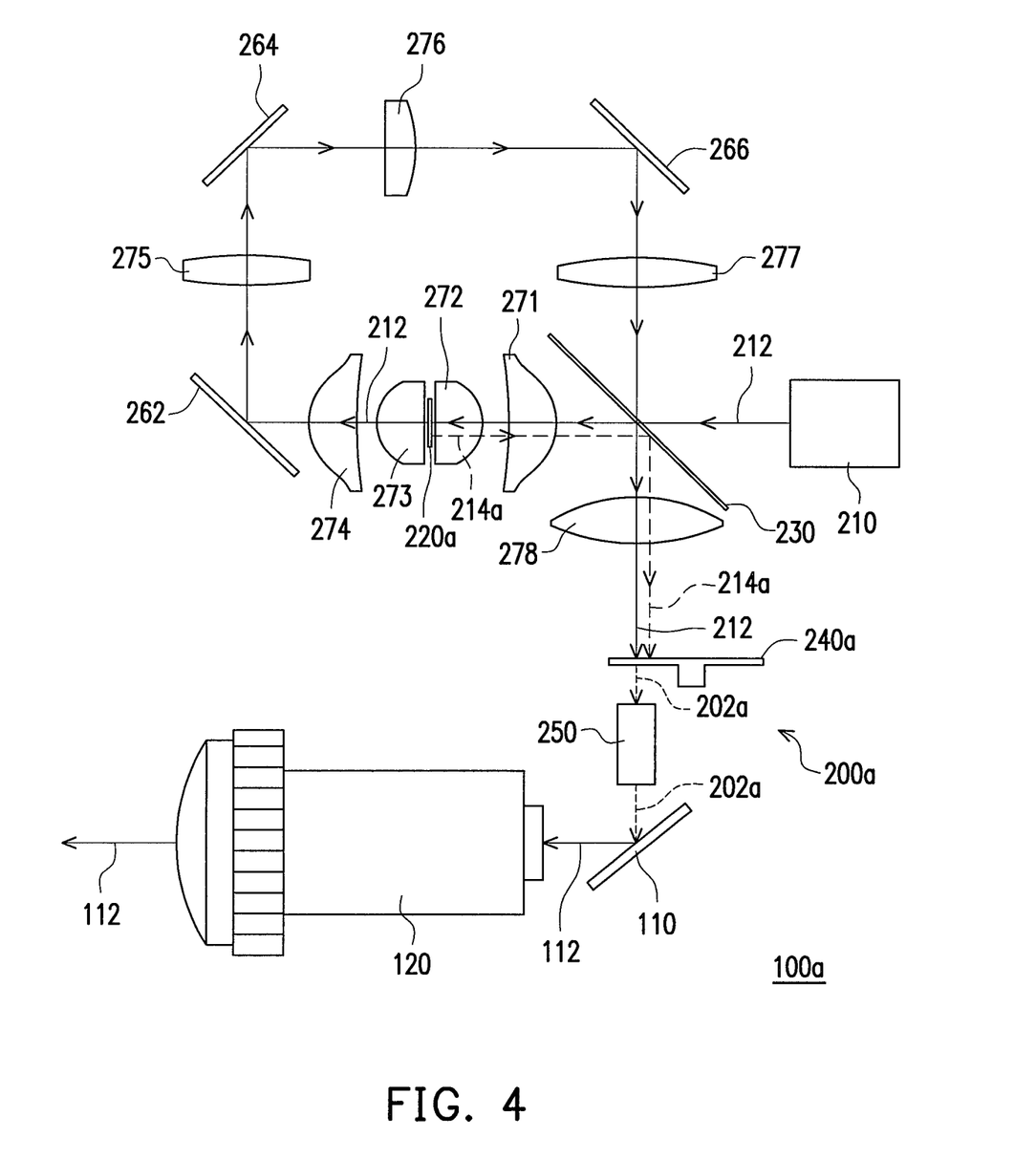
FIG. 4 illustrates a projection apparatus according to another embodiment of the invention.
Figure 5A:
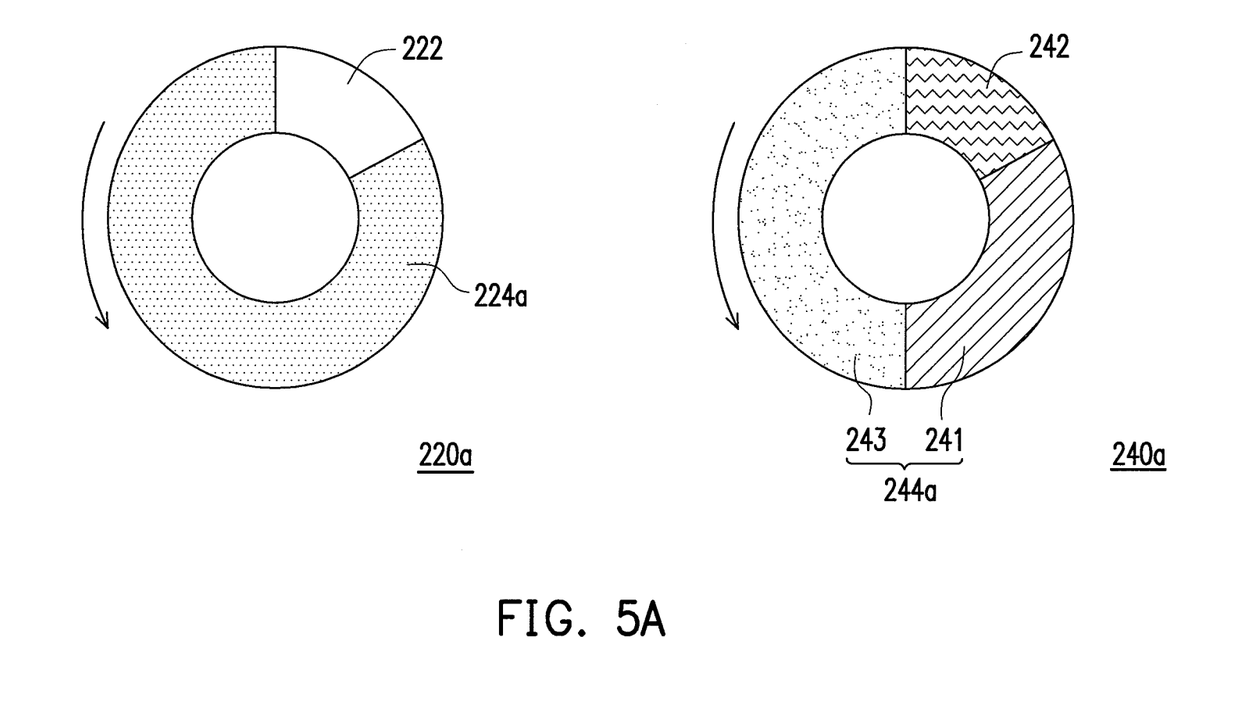
FIG. 5A is a front view of a phosphor switching module and a diffusion switching module of FIG. 4.

FIG. 4 illustrates a projection apparatus according to another embodiment of the invention, and FIG. 5A is a front view of the phosphor switching module and diffusion switching module of FIG. 4. Referring to FIG. 4 and FIG. 5A, the projection apparatus 100a of the embodiment is similar to the projection apparatus 100 of FIG. 1, with the differences described as follows. In the illumination system 200a of the embodiment, the first phosphor reflecting section 224a of the phosphor switching module 220a is a yellow phosphor reflecting section, and the first light permeable section 244a of the diffusion switching module 240a includes a red sub-filtering section 241 and a green sub-filtering section 243. The first phosphor reflecting section 224a is capable of converting the coherent light beam 212 into the first color light beam 214a, i.e. a yellow light beam. This yellow light beam is not a pure yellow light beam, and the band of this yellow light beam includes wavelengths of red, yellow and green, a combination of which presents a yellow color. In the embodiment, when the first phosphor reflecting section 224a of the phosphor switching module 220a is switched into the transmission path of the coherent light beam 212, the red sub-filtering section 241 and the green sub-filtering section 243 are switched into the transmission path of the first color light beam 214a from the beam combining unit 230 by turns. When the red sub-filtering section 241 is switched into the transmission path of the first color light beam 214a, the red sub-filtering section 241 filters the yellow and green wavelengths out of the first color light beam 214a to produce a red light beam. In addition, when the green sub-filtering section 243 is switched into the transmission path of the first light beam 214a, the green sub-filtering section 241 filters the red and yellow wavelengths out of the first color light beam 214a to produce a green light beam. As a result, the coherent light beam after being diffused, the red light beam and the green light beam can form the illumination light beam 202a.

Figure 5B:
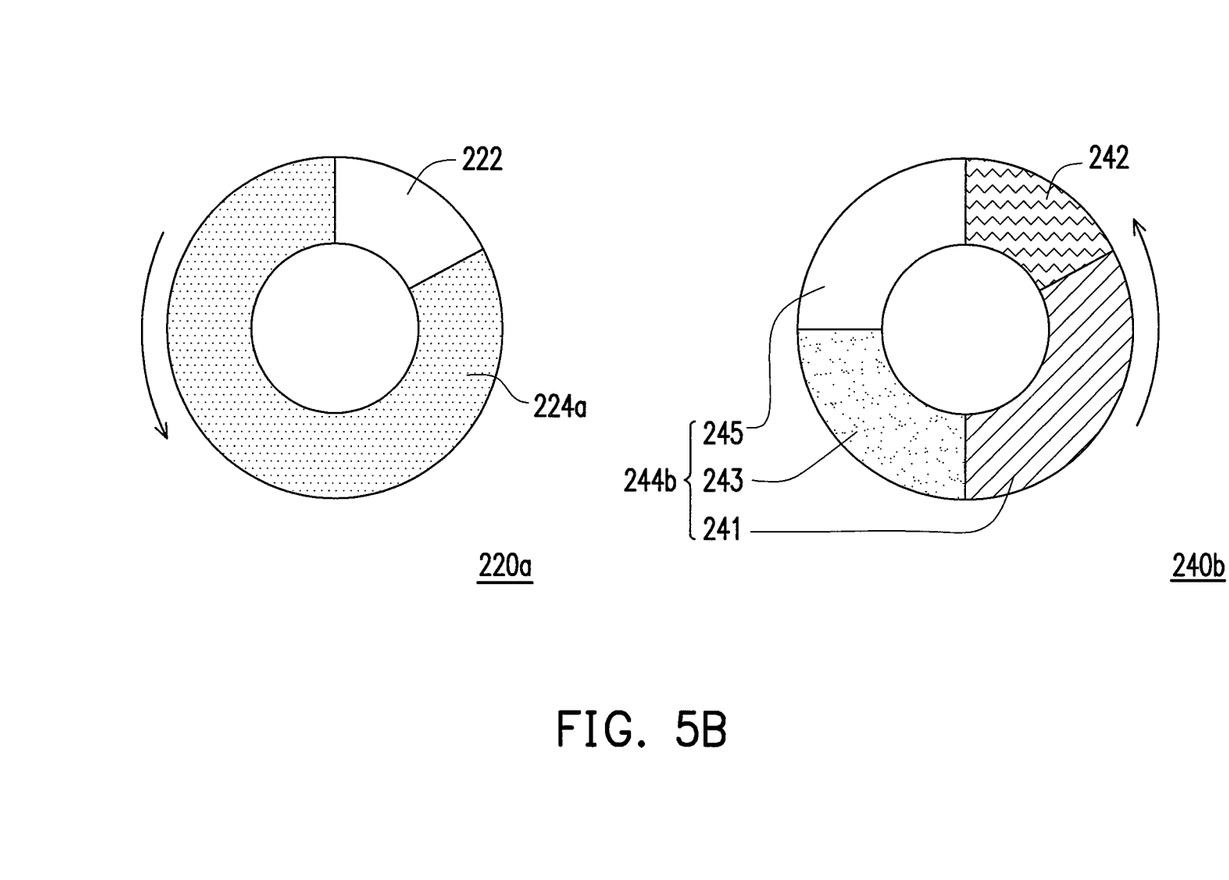
FIG. 5B illustrates a modified embodiment of the phosphor switching module and a diffusion switching module of FIG. 4 and FIG. 5A.

FIG. 5B illustrates a modified embodiment of the phosphor switching module and diffusion switching module of FIG. 4 and FIG. 5A. Referring to FIG. 4 and FIG. 5B, in the embodiment, the first light permeable section 244b of the diffusion switching module 240b further includes a sub-transparent section 245. When the first phosphor reflecting section 224a of the phosphor switching module 220a is switched into the transmission path of the coherent light beam 212, the red sub-filtering section 241, green sub-filtering section 243 and sub-transparent section 245 are switched into the transmission path of the first color light beam 214a from the beam combining unit 230 by turns. When the sub-transparent section 245 is switched into the transmission path of the first color light beam 214a, because the sub-transparent section 245 is transparent, the first color light beam 214a presenting the yellow color is transmitted through the sub-transparent section 245 to the light uniforming element 250. In other words, in the embodiment, the illumination light beam is formed by the red light beam, green light beam, yellow light beam and blue light beam and, as such, the projection apparatus can project color-richer images.

Figure 6:
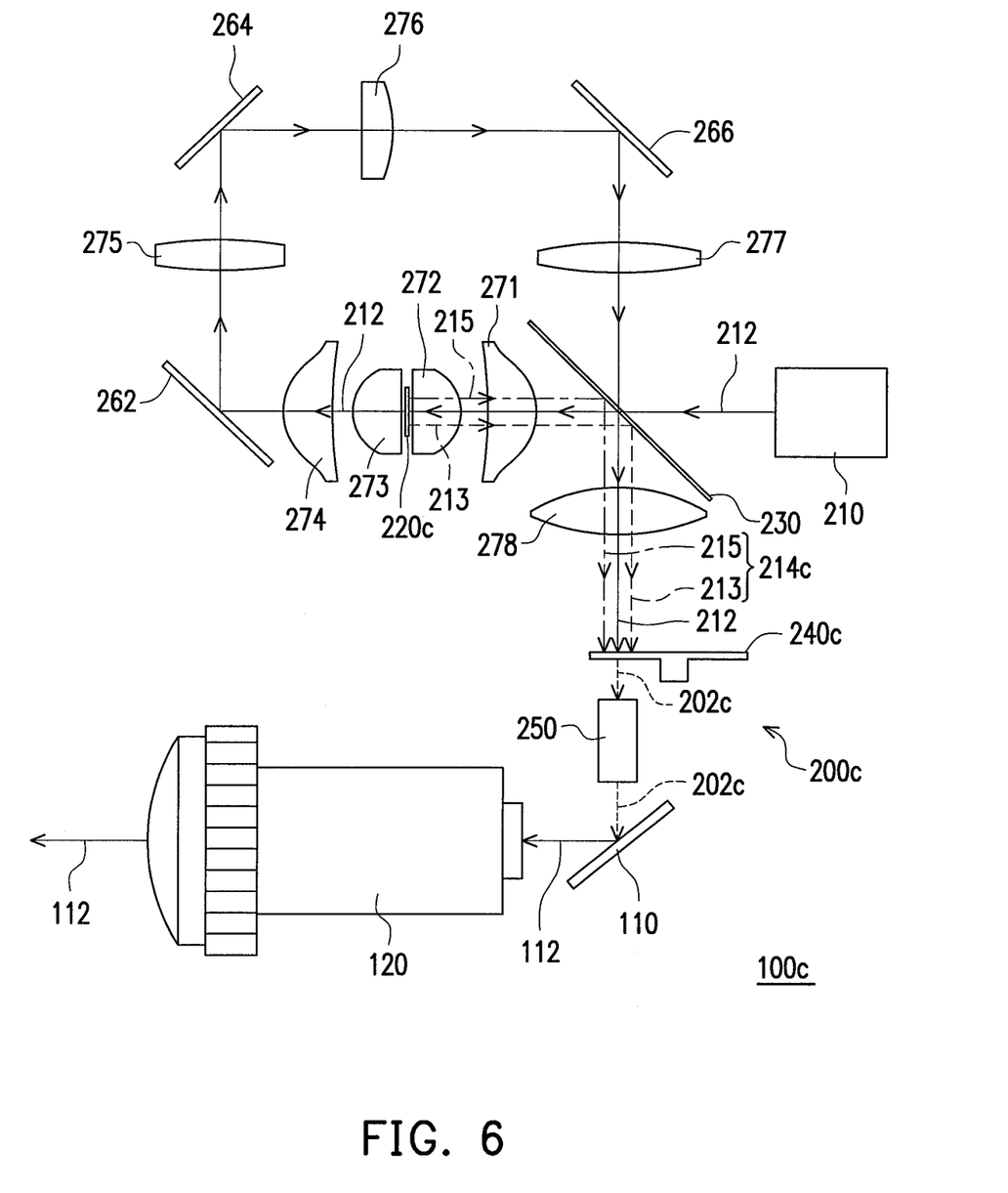
FIG. 6 illustrates a projection apparatus according to another embodiment of the invention.
Figure 7:
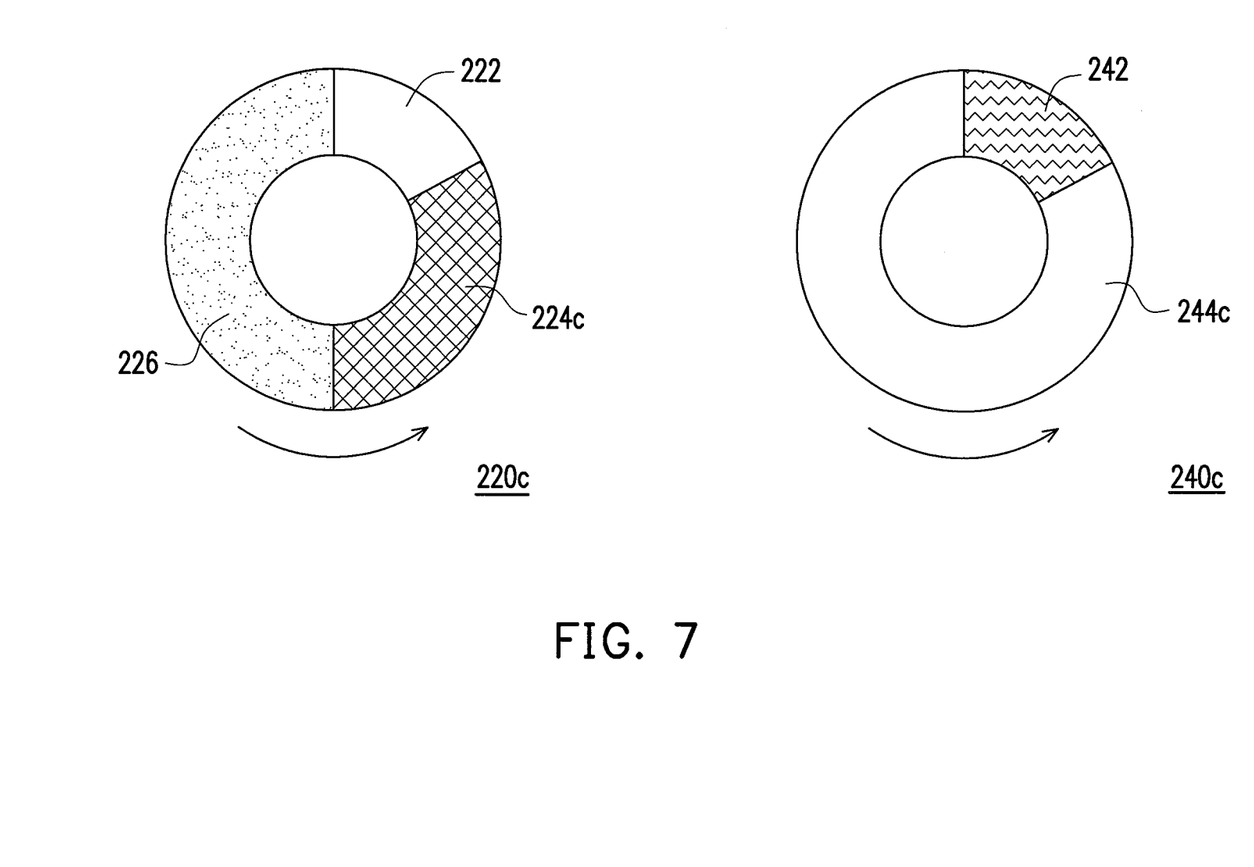
FIG. 7 is a front view of a phosphor switching module and a diffusion switching module of FIG. 6.

FIG. 6 illustrates a projection apparatus according to another embodiment of the invention, and FIG. 7 is a front view of the phosphor switching module and diffusion switching module of FIG. 6. Referring to FIG. 6 and FIG. 7, the projection apparatus 100c of the embodiment is similar to the projection apparatus 100 of FIG. 1, with the differences described as follows. In the illumination system 200c of the embodiment, the light passing section 222, first phosphor reflecting section 224c and second phosphor reflecting section 226 are switched into the transmission path of the coherent light beam 212 by turns, and the first light permeable section 244c is a transparent section. In the embodiment, the first phosphor reflecting section 224c is, for example, a red phosphor reflecting section. When the first phosphor reflecting section 224c and second phosphor reflecting section 226 of the phosphor switching module 220c are switched into the transmission path of the coherent light beam 212, the first light permeable section 244c of the diffusion switching module 240c is located at the transmission path of the first color light beam 214c from the beam combining unit 230. Specifically, when the first phosphor reflecting section 224c is switched into the transmission path of the coherent light beam 212, the first phosphor reflecting section 224c converts and reflects the coherent light beam 212 into a sub-light beam 213 which, in the embodiment, is a red light beam. The sub-light beam 214 is then transmitted by the beam combining unit 230 to the first light permeable section 244c and then transmitted through the first light permeable section 244c. On the other hand, when the second phosphor reflecting section 226 is switched into the transmission path of the coherent light beam 212, the second phosphor reflecting section 226 converts and reflects the coherent light beam 212 into a sub-light beam 215. The sub-light beam 215, in the embodiment, is a green light beam. The sub-light beam 215 is then transmitted by the beam combining unit 230 to the first light permeable section 244c and then transmitted through the first light permeable section 244c. The sub-light beam 213 and sub-light beam 215 are transmitted to the diffusion switching module 240c by turns and, therefore, can be considered as being combined into the first color light beam 214c. In addition, in the embodiment, the first color light beam 214c can be considered as a yellow light beam formed by the red light beam and the green light beam. In the embodiment, the illumination light beam 202c is formed by the red light beam, green light beam and blue light beam. Therefore, the projection apparatus 100c can project full color images.

In another embodiment, the first phosphor reflecting section 244 of FIG. 2 can be used to replace the first phosphor reflecting section 224c of FIG. 7. In this case, the illumination light beam 202c is formed by the orange-red light beam, green light beam and blue light beam, which still enables the projection apparatus to project full color images.

In summary, embodiments of the invention may have at least one of the following advantages.

1. In the projection apparatus and illumination system of embodiments of the invention, the light diffusion section is disposed in the diffusion switching module that is disposed on a downstream light path of the phosphor switching module. Therefore, the coherent light beam can excite the first phosphor reflecting section of the phosphor switching module without damaging the light diffusion section. Therefore, the lifespan of the light diffusion section can be prolonged, thus prolonging the lifespan of the projection apparatus and illumination system.

2. The Etendue of light is generally increased after the light passes through a diffusion section. Using large sized optical elements can improve the collection efficiency of light, but increases the overall size of the optical system at the same time. Therefore, the disposition of the diffusion section can be of critical importance. In embodiments of the invention, the light diffusion section is disposed in the diffusion switching module that is disposed on the downstream light path of the phosphor switching module, such that the Etendue of light can be small. As a result, small sized optical elements can be used, which can reduce the overall size of the optical system.

3. The phosphor switching module replaces the red phosphor with the orange-red phosphor, which can increase the conversion efficiency of the phosphor to improve the color performance.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system comprising:
   a coherent light source capable of emitting a coherent light beam;

a phosphor switching module disposed on a transmission path of the coherent light beam, the phosphor switching module comprising a light passing section and a first phosphor reflecting section, wherein the light passing section and the first phosphor reflecting section are capable of being switched into the transmission path of the coherent light beam by turns, and the first phosphor reflecting section is capable of converting and reflecting the coherent light beam into a first color light beam;

a beam combining unit capable of combining the coherent light beam passing through the light passing section and the first color light beam converted and reflected by the first phosphor reflecting section; and a diffusion switching module disposed on transmission paths of the coherent light beam and the first color light beam from the beam combining unit to process the coherent light beam and the first color light beam into an illumination light beam, the diffusion switching module comprising a light diffusion section and a first light permeable section, wherein the light diffusion section of the diffusion switching module is switched into the transmission path of the coherent light beam from the beam combining unit when the light passing section of the phosphor switching module is switched into the transmission path of the coherent light beam.

2. The illumination system according to claim 1, wherein the first light permeable section of the diffusion switching module is switched into the transmission path of the first color light beam from the beam combining unit when the first phosphor reflecting section of the phosphor switching module is switched into the transmission path of the coherent light beam.

3. The illumination system according to claim 1, wherein the phosphor switching module further comprises a second phosphor reflecting section; the light passing section, the first phosphor reflecting section and the second phosphor reflecting section are capable of being switched into the transmission path of the coherent light beam by turns, the second phosphor reflecting section is capable of converting and reflecting the coherent light beam into a second color light beam, and the beam combining unit is capable of combining the coherent light beam passing through the light passing section, the first color light beam converted and reflected by the first phosphor section, and the second color light beam converted and reflected by the second phosphor section.

4. The illumination system according to claim 3, wherein the first light permeable section of the diffusion switching module is a light filtering section, the diffusion switching module further comprises a second light permeable section, and the second light permeable section of the diffusion switching module is switched into the transmission path of the second color light beam from the beam combining unit when the second phosphor reflecting section of the phosphor switching module is switched into the transmission path of the coherent light beam.

5. The illumination system according to claim 4, wherein the coherent light beam is a blue light beam, the first phosphor reflecting section is an orange-red phosphor reflecting section, the first color light beam is an orange-red light beam, the second phosphor reflecting section is a green phosphor reflecting section, the second color light beam is a green light beam, the light filtering section is a red filtering section, and the second light permeable section is a transparent section.

6. The illumination system according to claim 1, wherein the first phosphor reflecting section of the phosphor switching module is a yellow phosphor reflecting section, the first light permeable section of the diffusion switching module comprises a red sub-filtering section and a green sub-filtering section, and the red sub-filtering section and the green sub-filtering section are switched into the transmission path of the first color light beam from the beam combining unit by turns when the first phosphor reflecting section of the phosphor switching module is switched into the transmission path of the coherent light beam.

7. The illumination system according to claim 6, wherein the first light permeable section of the diffusion switching module further comprises a sub-transparent section, and the red sub-filtering section, the green sub-filtering section and the sub-transparent section are switched into the transmission path of the first color light beam from the beam combining unit by turns when the first phosphor reflecting section of the phosphor switching module is switched into the transmission path of the coherent light beam.

8. The illumination system according to claim 2, wherein the phosphor switching module further comprises a second phosphor reflecting section; the light passing section, the first phosphor reflecting section and the second phosphor reflecting section are capable of being switched into the transmission path of the coherent light beam by turns, the second phosphor reflecting section is capable of converting and reflecting the coherent light beam into a second color light beam, the beam combining unit is capable of combining the coherent light beam passing through the light passing section, the first color light beam converted and reflected by the first phosphor reflecting section, and the second color light beam converted and reflected by the second phosphor reflecting section, the first light permeable section of the diffusion switching module is located at the transmission path of the first color light beam from the beam combining unit when the first phosphor reflecting section and second phosphor reflecting section of the phosphor switching module are switched into the transmission path of the coherent light beam by turns, and the first light permeable section is a transparent section.

9. The illumination system according to claim 1, further comprising a light uniforming element disposed on the transmission path of the illumination light beam from the diffusion switching module.

10. The illumination system according to claim 1, wherein the beam combining unit is a dichroic mirror, the dichroic mirror is capable of allowing one of the coherent light beam and the first color light beam to pass through and capable of reflecting the other of the coherent light beam and the first color light beam.

11. The illumination system according to claim 1, wherein the beam combining unit is disposed on the transmission path of the coherent light beam and between the coherent light source and the phosphor switching module, and the illumination system further comprises a plurality of reflecting mirrors disposed on the transmission path of the coherent light beam from the light passing section of the phosphor switching module to sequentially reflect the coherent light beam back to the beam combining unit.

12. The illumination system according to claim 1, wherein the phosphor switching module and the diffusion switching module are each a rotary wheel for rotation.

13. The illumination system according to claim 1, wherein the light passing section of the phosphor switching module is a transparent section or an opening without material disposed thereat.

14. A projection apparatus comprising:
an illumination system comprising:
a coherent light source capable of emitting a coherent light beam;

a phosphor switching module disposed on a transmission path of the coherent light beam, the phosphor switching module comprising a light passing section and a first phosphor reflecting section, wherein the light passing section and the first phosphor reflecting section are capable of being switched into the transmission path of the coherent light beam by turns, and the first phosphor reflecting section is capable of converting and reflecting the coherent light beam into a first color beam;

a beam combining unit capable of combining the coherent light beam passing through the light passing section and the first color light beam converted and reflected by the first phosphor reflecting section; and a diffusion switching module disposed on a transmission path of the coherent light beam and the first color light beam from the beam combining unit to process the coherent light beam and the first color light beam into an illumination light beam, the diffusion switching module comprising a light diffusion section and a first light permeable section, wherein the light diffusion section of the diffusion switching module is switched into the transmission path of the coherent light beam from the beam combining unit when the light passing section of the phosphor switching module is switched into the transmission path of the coherent light beam;

a light valve disposed on the transmission path of the illumination light beam from the diffusion switching module to convert the illumination light beam into an image light beam; and a projection lens disposed on a transmission path of the image light beam.

15. The projection apparatus according to claim 14, wherein the first light permeable section of the diffusion switching module is switched into the transmission path of the first color light beam from the beam combining unit when the first phosphor reflecting section of the phosphor switching module is switched into the transmission path of the coherent light beam.

16. The projection apparatus according to claim 15, wherein the phosphor switching module further comprises a second phosphor reflecting section; the light passing section, the first phosphor reflecting section and the second phosphor reflecting section are capable of being switched into the transmission path of the coherent light beam by turns, the second phosphor reflecting section is capable of converting and reflecting the coherent light beam into a second color light beam, and the beam combining unit is capable of combining the coherent light beam passing through the light passing section, the first color light beam converted and reflected by the first phosphor section, and the second color light beam converted and reflected by the second phosphor section.

17. The projection apparatus according to claim 16, wherein the first light permeable section of the diffusion switching module is a first light filtering section, the diffusion switching module further comprises a second light permeable section, and the second light permeable section of the diffusion switching module is switched into the transmission path of the second color light beam from the beam combining unit when the second phosphor reflecting section of the phosphor switching module is switched into the transmission path of the coherent light beam.

18. The projection apparatus according to claim 17, wherein the coherent light beam is a blue light beam, the first phosphor reflecting section is an orange-red phosphor reflecting section, the first color light beam is an orange-red light beam, the second phosphor reflecting section is a green phosphor reflecting section, the second color light beam is a green light beam, the first light filtering section is a red filtering section, and the second light permeable section is a transparent section.

19. The projection apparatus according to claim 14, wherein the first phosphor reflecting section of the phosphor switching module is a yellow phosphor reflecting section, the first light permeable section of the diffusion switching module comprises a red sub-filtering section and a green sub-filtering section, and the red sub-filtering section and the green sub-filtering section are switched into the transmission path of the first color light beam from the beam combining unit by turns when the first phosphor reflecting section of the phosphor switching module is switched into the transmission path of the coherent light beam.

20. The projection apparatus according to claim 17, wherein the first light permeable section of the diffusion switching module further comprises a sub-transparent section, and the red sub-filtering section, green sub-filtering section and sub-transparent section are switched into the transmission path of the first color light beam from the beam combining unit by turns when the first phosphor reflecting section of the phosphor switching section is switched into the transmission path of the coherent light beam.

21. The projection apparatus according to claim 14, wherein the phosphor switching module further comprises a second phosphor reflecting section; the light passing section, the first phosphor reflecting section and the second phosphor reflecting section are capable of being switched into the transmission path of the coherent light beam by turns, the second phosphor reflecting section is capable of converting and reflecting the coherent light beam into a second color light beam, the beam combining unit is capable of combining the coherent light beam passing through the light passing section, the first color light beam converted and reflected by the first phosphor reflecting section, and the second color light beam converted and reflected by the second phosphor reflecting section, the first light permeable section of the diffusion switching module is located at the transmission path of the first color light beam from the beam combining unit when the first phosphor reflecting section and second phosphor reflecting section of the phosphor switching module are switched into the transmission path of the coherent light beam by turns, and the first light permeable section is a transparent section.

22. The projection apparatus according to claim 14, wherein the illumination system further comprises a light uniforming element disposed on the transmission path of the illumination light beam and between the diffusion switching module and the light valve.

23. The projection apparatus according to claim 14, wherein the beam combining unit is a dichroic mirror, the dichroic mirror is capable of allowing one of the coherent light beam and the first color light beam to pass through, and capable of reflecting the other of the coherent light beam and the first color light beam.

24. The projection apparatus according to claim 14, wherein the beam combining unit is disposed on the transmission path of the coherent light beam and between the coherent light source and the phosphor switching module, and the illumination system further comprises a plurality of reflecting mirrors disposed on the transmission path of the coherent light beam from the light passing section of the phosphor switching module to sequentially reflect the coherent light beam back to the beam combining unit.

25. The projection apparatus according to claim 14, wherein the phosphor switching module and the diffusion switching module are each a rotary wheel for rotation.

26. The projection apparatus according to claim 14, wherein the light passing section of the phosphor switching module is a transparent section or an opening without material disposed thereat.

\* \* \* \* \*